(12) United States Patent
Wang et al.

(10) Patent No.: US 10,805,320 B1
(45) Date of Patent: Oct. 13, 2020

(54) METHODS AND SYSTEMS FOR INSPECTING ENCRYPTED NETWORK TRAFFIC

(71) Applicant: Trend Micro Incorporated, Tokyo (JP)

(72) Inventors: Kelong Wang, Nanjing (CN); Jian Sun, Nanjing (CN); Zheng Wang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 243 days.

(21) Appl. No.: 16/009,819

(22) Filed: Jun. 15, 2018

(51) Int. Cl.
*H04L 29/06* (2006.01)
*H04L 9/32* (2006.01)

(52) U.S. Cl.
CPC ........ *H04L 63/1416* (2013.01); *H04L 9/3263* (2013.01); *H04L 63/10* (2013.01); *H04L 63/168* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 6,892,307 | B1 * | 5/2005 | Wood | G06F 21/41 713/155 |
| 8,819,772 | B2 * | 8/2014 | Bettini | H04L 63/105 726/1 |
| 8,856,869 | B1 * | 10/2014 | Brinskelle | G06F 21/31 726/2 |
| 9,065,854 | B2 | 6/2015 | Goyal et al. | |
| 9,300,629 | B1 | 3/2016 | Jahr | |
| 9,509,661 | B2 | 11/2016 | Ardeli et al. | |
| 9,578,007 | B2 | 2/2017 | Martin et al. | |
| 9,590,979 | B2 | 3/2017 | Jahr | |
| 9,621,574 | B2 * | 4/2017 | Desai | H04L 63/1441 |
| 9,967,264 | B2 * | 5/2018 | Harris | H04L 63/1416 |

(Continued)

OTHER PUBLICATIONS

Martin Husak, et al. "Network-based HTTPS Client Identification Using SSL/TLS Fingerprinting", pp. 1-8, [retrieved on May 30, 2018] Retrieved from the internet: https://is.muni.cz/repo/1299983/https_client_identification-paper.pdf.

(Continued)

*Primary Examiner* — Maung T Lwin
(74) *Attorney, Agent, or Firm* — Okamoto & Benedicto LLP (57) ABSTRACT

Encrypted network traffic between a server device and an application program running on a client device is monitored by a network security device in an enterprise computer network. Metadata of the application program is sent to a cloud security system to generate a reputation of the application program. The encrypted network traffic is decrypted and inspected for conformance with security policies when the application program is determined to be a browser application. When the application program is determined to be a non-browser application, the reputation of the application program is determined and the encrypted network traffic is blocked when the application program has a bad reputation. In a bypass mode of operation, the encrypted network traffic is allowed to pass through without inspection when the application program is determined to be a non-browser application.

18 Claims, 6 Drawing Sheets

(56) References Cited

U.S. PATENT DOCUMENTS

| | | | | |
|---|---|---|---|---|
| 2015/0074390 A1* | 3/2015 | Stoback | ............ | H04L 63/1483 |
| | | | | 713/156 |
| 2016/0080420 A1* | 3/2016 | Ray | ............ | G06F 16/285 |
| | | | | 726/1 |
| 2016/0191476 A1* | 6/2016 | Schutz | ............ | G06F 21/552 |
| | | | | 713/165 |
| 2018/0176240 A1* | 6/2018 | Kopp | ............ | H04L 63/145 |

OTHER PUBLICATIONS

JA3—A method for profiling SSL/TLS Clients, 3 sheets [retrieved on Jun. 6, 2018], Retrieved from the Internet: https://github.com/salesforce/ja3.

* cited by examiner

FIG. 7

METHODS AND SYSTEMS FOR INSPECTING ENCRYPTED NETWORK TRAFFIC

BACKGROUND OF THE INVENTION

1. Field of the Invention

The present invention relates generally to computer security, and more particularly but not exclusively to methods and systems for inspecting network traffic.

2. Description of the Background Art

Network traffic over enterprise computer networks may be inspected to enforce various security policies. Network traffic inspection entails inspection of the packets and payloads of the network traffic, such as by deep packet inspection. The security policies may include blocking spam, malware, communications with prohibited server devices, transmission of protected data, etc. Network traffic may be inspected by network security appliances, gateways, and other network security devices.

Hypertext Transfer Protocol (HTTP) is an application-layer protocol that allows network communication between a client device and a sever device. HTTP Secure (HTTPS) is a secure version of HTTP, wherein the network traffic is encrypted in accordance with a cryptographic protocol referred to as Transport Layer Security (TLS). The encryption makes HTTPS traffic particularly difficult to inspect. To prevent failed communications, some network security devices allow HTTPS traffic to certain server devices to bypass inspection. A network administrator, i.e., person in charge of managing the network, may manually enter the addresses (e.g., domain name) of these servers in a bypass list. When the network security device detects HTTPS traffic involving a server device in the bypass list, the network security device bypasses inspection of the HTTPS traffic. In that case, the network security device allows the HTTPS traffic to pass through without inspection. Maintenance of the bypass list is cumbersome and error prone.

SUMMARY

In one embodiment, encrypted network traffic between a server device and an application program running on a client device is monitored by a network security device in an enterprise computer network. Metadata of the application program is sent to a cloud security system to generate a reputation of the application program. The encrypted network traffic is decrypted and inspected for conformance with security policies when the application program is determined to be a browser application. When the application program is determined to be a non-browser application, the reputation of the application program is determined and the encrypted network traffic is blocked when the application program has a bad reputation. In a bypass mode of operation, the encrypted network traffic is allowed to pass through without inspection when the application program is determined to be a non-browser application.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
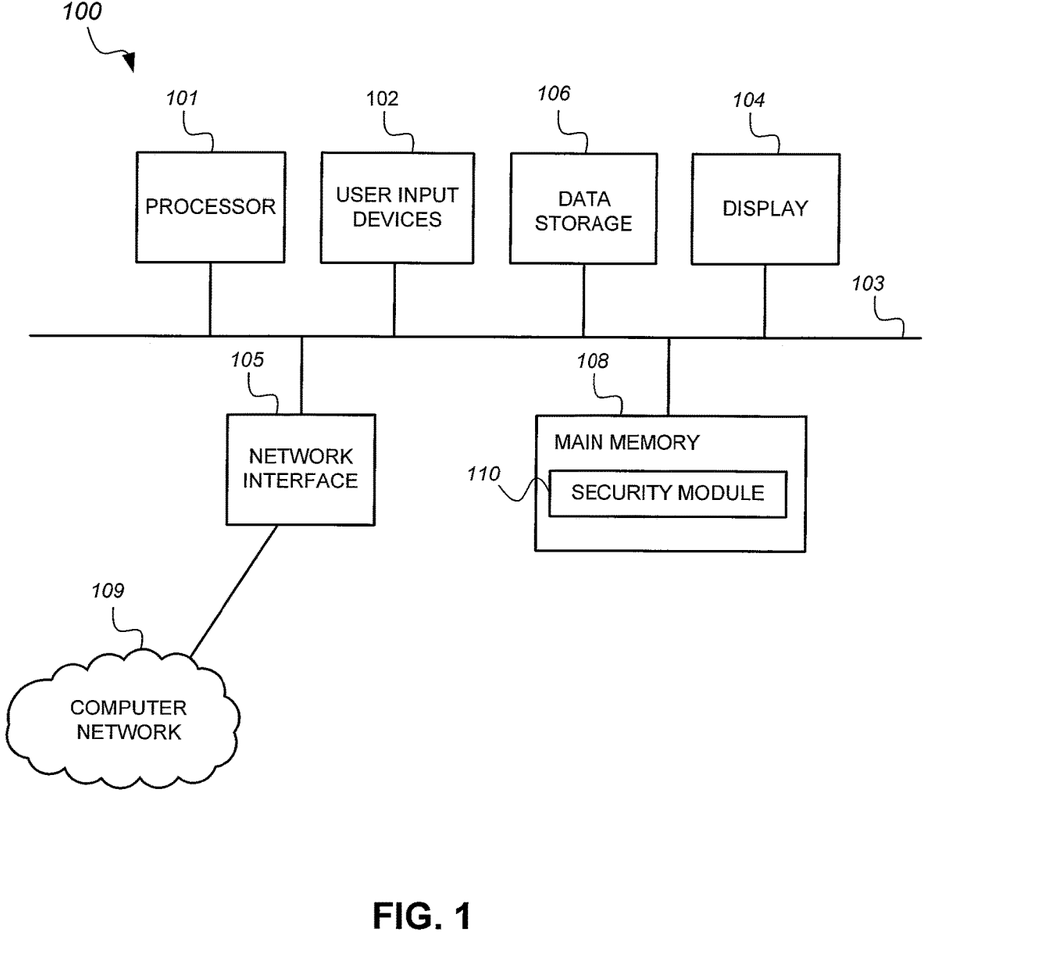
FIG. 1 is a logical diagram of a computer system in accordance with an embodiment of the present invention.

Referring now to FIG. 1, there is shown a logical diagram of a computer system 100 in accordance with an embodiment of the present invention. The computer system 100 may be employed as a network security device, a client device, or a cloud security system, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules.

In the example of FIG. 1, the software modules comprise components of a security module 110. The security module 110 may be configured to inspect encrypted network traffic when the computer system 100 is configured as a network security device. The security module 110 may be configured to generate TLS metadata when the computer system 100 is configured as a client device. The security module 110 may be configured to generate reputations of TLS applications based on TLS metadata received from a plurality of client devices when the computer system 100 is configured as a cloud security system.

As can be appreciated, the security modules 110 may also be implemented in hardware (e.g., application-specific integrated circuit, field-programmable gate array, programmable logic device) or a combination of hardware and software depending on the particulars of the implementation.

Figure 2:
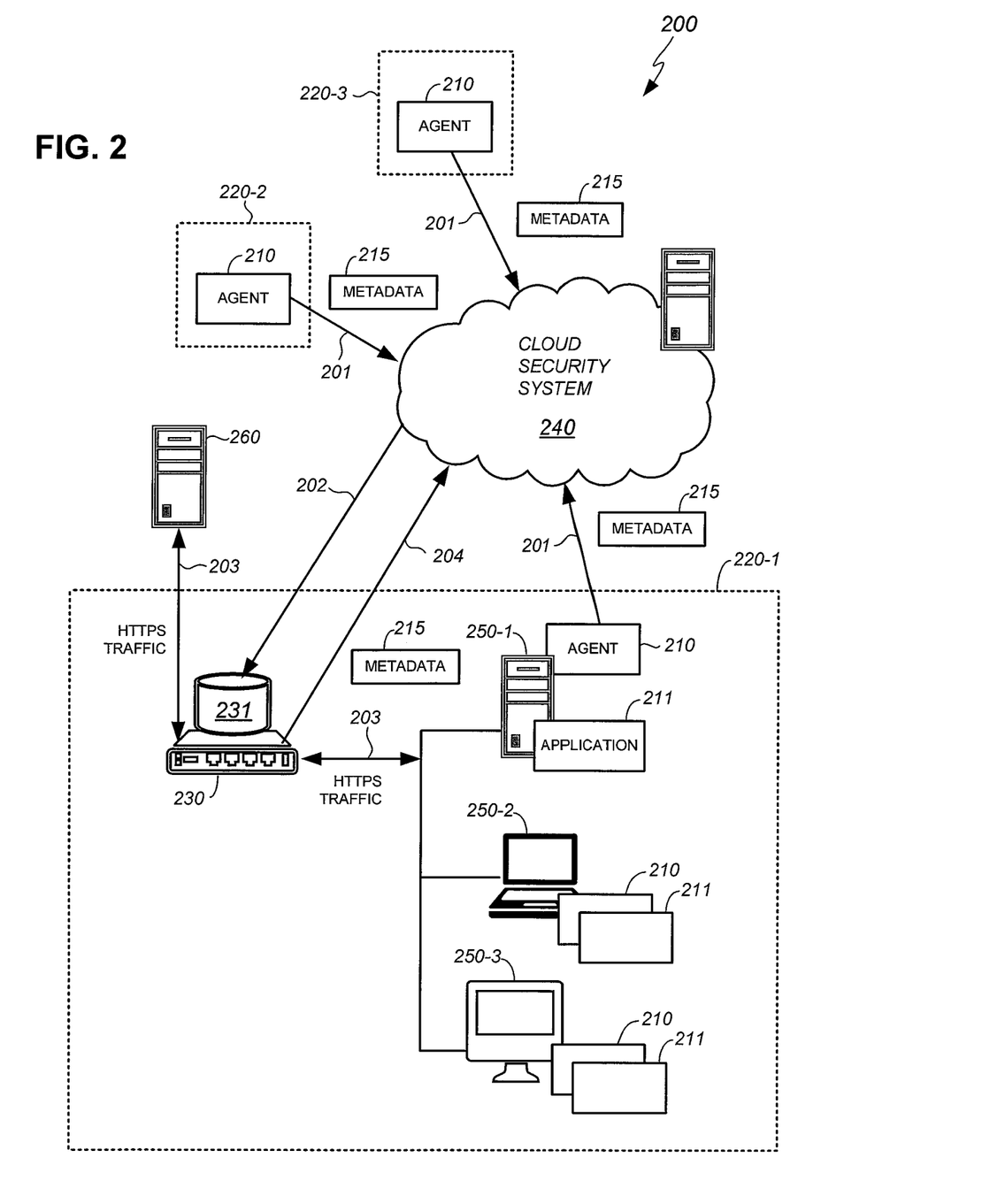
FIG. 2 is a logical diagram of a system for inspecting encrypted network traffic in accordance with an embodiment of the present invention.

FIG. 2 is a logical diagram of a system 200 for inspecting encrypted network traffic in accordance with an embodiment of the present invention. In the example of FIG. 2, the system 200 includes a network security device 230, one or more client devices 250 (250-1, 250-2, 250-3, . . . ) that each hosts a user agent 210, and a cloud security system 240. The system 200 may have fewer or more components depending on implementation.

A TLS application 211 is an application program that communicates over a computer network in accordance with the TLS cryptographic protocol. A TLS application 211 may be a browser or a non-browser application. A browser application is an application program that is primarily used for web browsing, i.e., a web browser; a non-browser application is an application program that is not a browser application. In one embodiment, a non-browser application is a dedicated client application program for a particular service provided by a server device. As an example, a TLS application 211 that is a browser application may be a GOOGLE CHROME web browser, INTERNET EXPLORER web browser, FIREFOX web browser, or other web browser that communicates with different websites by HTTPS. As another example, a TLS application 211 that is a non-browser application may be the GOOGLE GMAIL email app that communicates with the GOOGLE GMAIL server by HTTPS.

In one embodiment, an enterprise computer network 220 (220-1, 220-2, 220-3, . . . ) is a private computer network of a government, corporation, or other organization. In the example of FIG. 2, an enterprise computer network 220-1 may comprise a network security device 230 and one or more client devices 250. Other enterprise computer networks 220 may have the same components, but only the components of the enterprise computer network 220-1 are shown for clarity of illustration.

In one embodiment, a client device 250 is an end-user computer system running an agent 210 and one or more TLS applications 211. In one embodiment, an agent 210 is configured to monitor HTTPS traffic of a TLS application 211 running on the client device 250, determine whether the TLS application 211 is a non-browser application or a browser application, generate a fingerprint of the TLS application 211 ("TLS fingerprint"), identify the server device in communication with the TLS application 211, extract the digital certificate of the server device in communication with the TLS application 211, and forward a TLS metadata 215 to the cloud security system 240. In one embodiment, the TLS metadata 215 includes the TLS fingerprint of the TLS application 211, the identity of the server device in communication with the TLS application 211, and the digital certificate of the server device in communication with the TLS application 211.

In one embodiment, the cloud security system 240 is a computer system that is accessible over the Internet. The cloud security system 240 may be configured to receive TLS metadata 215 from a plurality of agents 210 of one or more enterprise computer networks 220 (see arrows 201) and/or the network security device 230 (see arrow 204). The cloud security system 240 may be configured to evaluate collected TLS metadata 215 of a TLS application 211 to generate a reputation of the TLS application 211. The reputation may indicate whether or not the TLS application 211 has a good reputation or a bad reputation. In one embodiment, HTTPS traffic of TLS applications 211 with good reputations may bypass inspection, i.e., be allowed to pass through and propagate over the enterprise computer network 200 without inspection. The cloud security system 240 may provide a listing of TLS applications 211 and their reputations to the network security device 230 (see arrow 202). The network security device 230 may store the listing of TLS applications 211 and their reputations in a datastore 231.

The network security device 230 may be configured to determine whether a TLS application 211 is a browser or non-browser application. The network security device 230 may also receive from the cloud security system 240 an indication on whether or not a TLS application 211 is a browser or non-browser application. The datastore 231 may include the listing of TLS applications 211 identified by their corresponding TLS fingerprints, the reputations of the TLS applications 211, and indications of whether the TLS applications 211 are browser or non-browser applications.

In an example operation, in the enterprise computer network 220-1, the network security device 230 may monitor HTTPS traffic between a server device 260 and the client device 250-1 (see arrows 203). The server device 260 may comprise a server computer system with server program. The HTTPS traffic comprises communication between the TLS application 211 on the client device 250-1 and the server program on the server device 260.

Generally speaking, the TLS cryptographic protocol has a handshake phase and a data transfer phase. During the handshake phase, the network security device 230 may receive a Client Hello message from the TLS application 211 running on the client device 250-1. The network security device 230 may be configured to generate the TLS fingerprint of the TLS application 211 from the cipher suite and TLS extensions included in the Client Hello message. The network security device 230 may consult the data store 231 to determine whether the TLS application 211 is a browser or non-browser application. The network security device 230 is configured to decrypt and inspect HTTPS traffic between the server device 260 and the TLS application 211 when the TLS application 211 is a browser application.

In a bypass mode of operation, the network security device 230 may be configured to bypass inspection of the HTTPS traffic between the server device 260 and the TLS application 211 when the TLS application 211 is determined to be a non-browser application.

In a normal mode of operation, when the TLS application 211 is determined to be a non-browser application, the network security device 230 may be configured to consult the data store 231 to get the reputation of the TLS application 211. The network security device 230 may be configured to perform a response action when the TLS application 211 has a bad reputation. The response action may include blocking the HTTPS traffic, sending an alert about the TLS application 211 (e.g., message the network administrator), blocking all network traffic involving the TLS application 211, etc.

Figure 3:
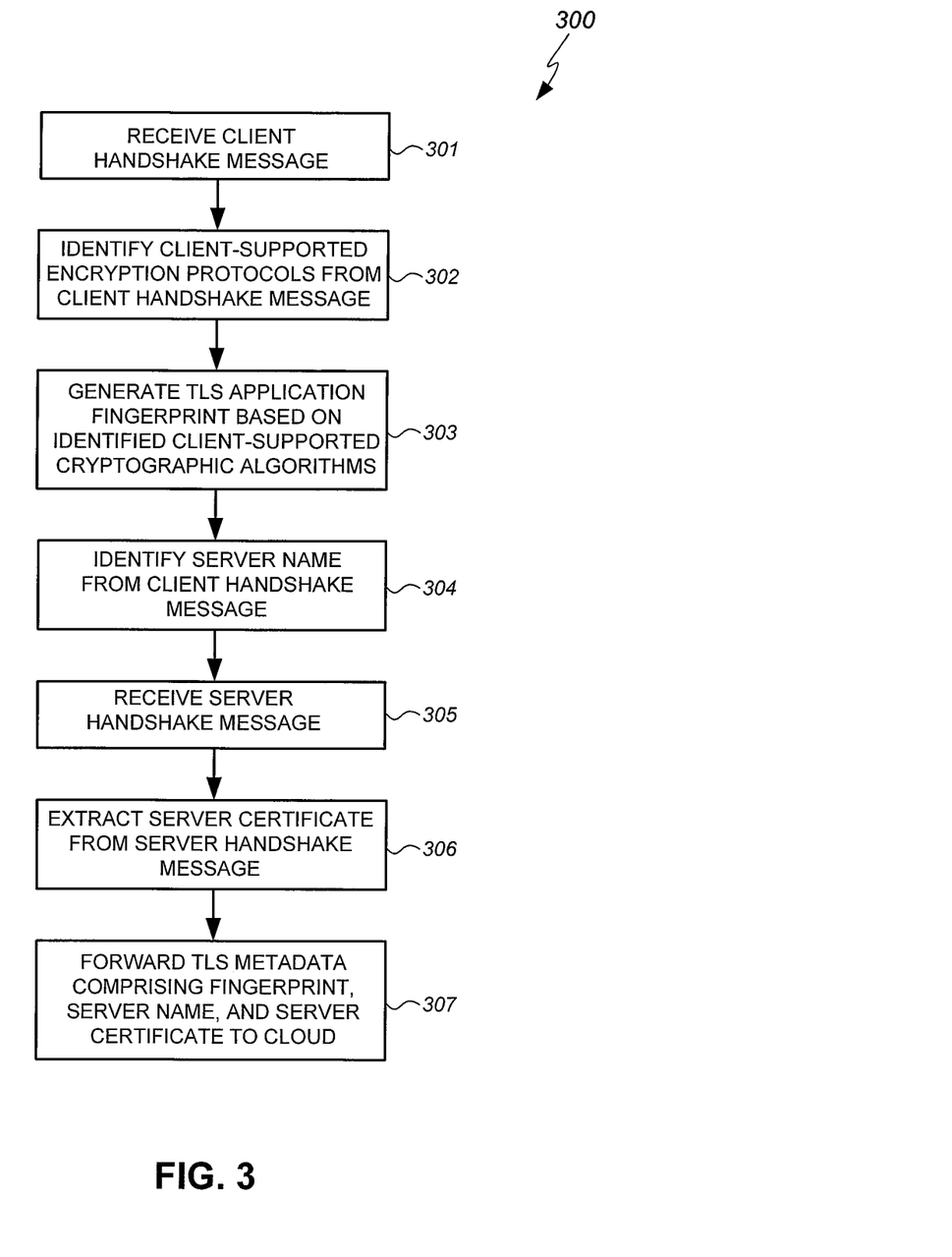
FIG. 3 is a flow diagram of a method of generating metadata in accordance with an embodiment of the present invention.

FIG. 3 is a flow diagram of a method 300 of generating TLS metadata in accordance with an embodiment of the present invention. The method 300 may be performed by an agent 210.

An agent 210 is illustrated in FIG. 2 as running on a client device 250 for illustration purposes. As can be appreciated, an agent 210 and/or its functionality may also be incorporated in the network security device 230. More particularly, the method 300 may also be performed by the network security device 230 to generate fingerprints of TLS applications 211, to generate TLS metadata 215 of TLS applications 211, and to send the TLS metadata 215 to the cloud security system 240 (see arrow 204).

The TLS cryptographic protocol has a handshake phase during which the client and the server agrees on a cryptographic algorithm and other connection setup, and a data transfer phase during which encrypted data is transmitted between the client and the server. In the example of FIG. 3, during the handshake phase, the agent 210 receives a client handshake message in the form of a Client Hello message that is sent by a TLS application 211 running on the client device 250 (step 301). The Client Hello message includes a cipher suite, which comprises a list of cryptographic algorithms that the TLS application 211 supports (step 302). The cipher suite varies by TLS application, and may thus be used as a TLS fingerprint for identifying a TLS application. The Client Hello message also includes a list of TLS extensions, which may also be used in conjunction with the cipher suite to generate the TLS fingerprint for identifying a TLS application. The cipher suite and/or particular TLS extensions may be used as-is, hashed, etc. to generate the TLS fingerprint (step 303). Other suitable methods of identifying TLS applications 211 may also be used without detracting from the merits of the present invention.

The Client Hello message also includes a server name indication, which indicates the server name of the server device that the TLS application 211 is communicating with. The server name may be the domain name of the server device. In this example, the agent 210 identifies the server name of the server device 260 from the Client Hello message (step 304).

During the handshake phase, the agent 210 receives a server handshake message in the form of a Server Hello message that is sent by the server device 260 (step 305). The Server Hello message includes the digital certificate of the server device 260. The agent 210 extracts the digital certificate of the server device 260 from the Server Hello message (step 306).

The agent 210 generates a TLS metadata 215 comprising the TLS fingerprint of the TLS application 211, the server name of the server device 260, and the digital certificate of the server device 260. The agent 210 forwards the TLS metadata 215 to the cloud computer security system 240 (step 307).

Figure 4:
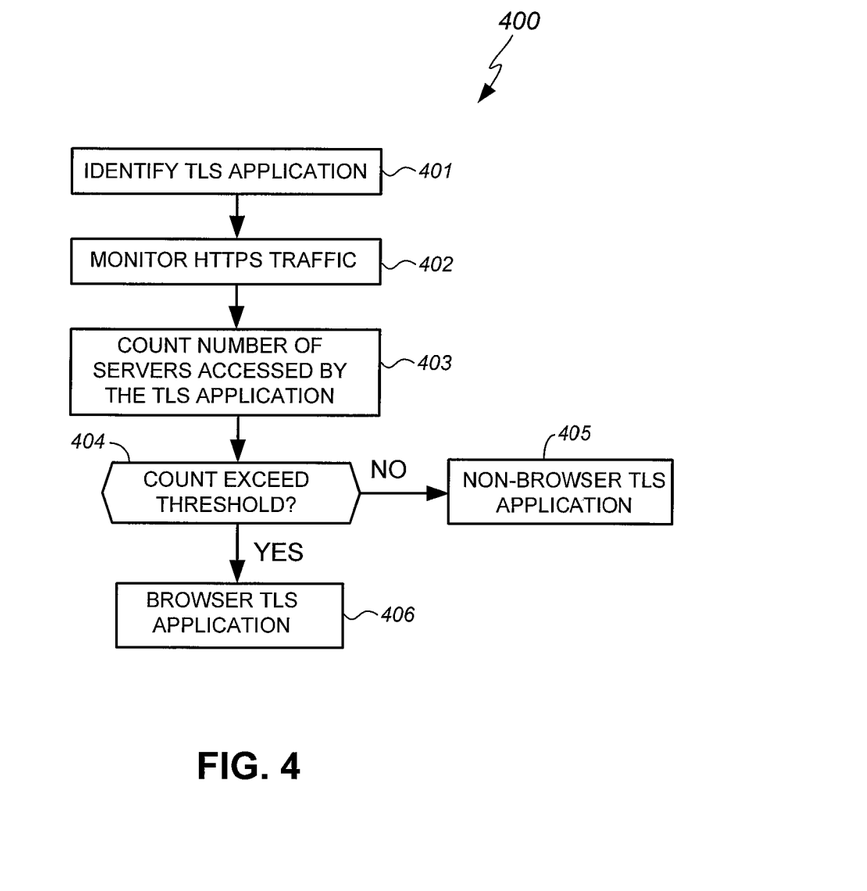
FIG. 4 is a flow diagram of a method of determining whether an application program is a browser or a non-browser application in accordance with an embodiment of the present invention.

FIG. 4 is a flow diagram of a method 400 of determining whether a TLS application 211 is a browser or non-browser application in accordance with an embodiment of the present invention. The method 400 may be performed by an agent 210 to determine whether a TLS application 211 is a browser application or a non-browser application, for example.

An agent 210 is illustrated in FIG. 2 as running on a client device 250 for illustration purposes. As can be appreciated, an agent 210 and/or its functionality may also be incorporated in the network security device 230. More particularly, the network security device 230 may perform the method 400 to determine whether a TLS application 211 is a browser or non-browser application.

In the example of FIG. 4, an agent 210 identifies a TLS application 211 based on its TLS fingerprint (step 401). The agent 210 monitors HTTPS traffic of the TLS application 211 (step 402). The agent 210 may count the number of different servers accessed by the TLS application 211 over a period of time (step 403).

A browser application is normally used for browsing different websites, and accordingly accesses many different servers. In contrast, a non-browser application typically accesses one or a limited number of servers, which may be hard-coded in the application. Therefore, a browser application may be distinguished from a non-browser application based on the number of different servers accessed by the application over a period of time. A count threshold may thus be set to identify the TLS application 211 as either a browser application or a non-browser application (step 404). When the number of different servers accessed by the TLS application 211 over the period of time does not exceed the threshold, the agent 210 deems the TLS application 211 to be a non-browser application (step 404 to step 405). When the number of different servers accessed by the TLS application 211 over the period of time exceeds the threshold, the agent 210 deems the TLS application 211 to be a browser application (step 404 to step 406).

Figure 5:
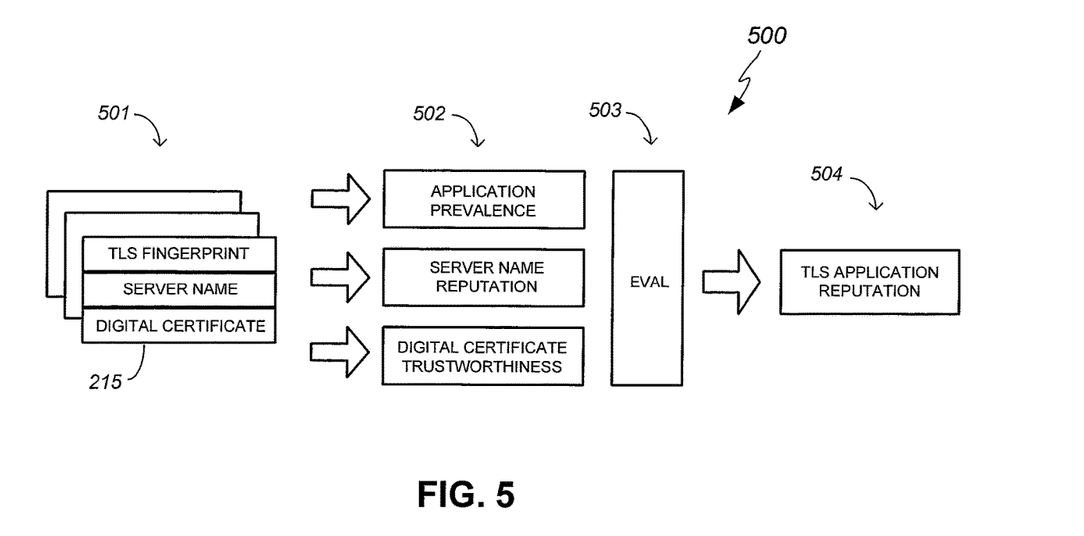
FIG. 5 is a flow diagram of a method of determining a reputation of an application program in accordance with an embodiment of the present invention.

FIG. 5 is a flow diagram of a method 500 of determining a reputation of a TLS application 211 in accordance with an embodiment of the present invention. The method 500 may be performed by the cloud security system 240 to generate reputations of TLS applications 211 from TLS metadata 215 received from a plurality of agents 210 and/or network security devices 230, for example.

In the example of FIG. 5, the cloud security system 240 receives a plurality of TLS metadata 215 from a plurality of agents 210 and/or network security devices 230 over the Internet (see arrow 501). The plurality of TLS metadata 215 may be received from different enterprise computer networks 220. In the example of FIG. 5, a TLS metadata 215 may include a server name and a digital certificate of the server device that the TLS application 211 is communicating with. The TLS fingerprint of the TLS application 211 is included in the TLS metadata 215 for identification purposes.

In the example of FIG. 5, the cloud security system 240 is configured to generate the reputation of a TLS application 211 based on prevalence of the TLS application 211, the reputation of the server name, and the trustworthiness of the digital certificate (see arrow 502). The prevalence of the TLS application 211 is a count of how many instances of the TLS application 211 have been detected in the various enterprise computer networks 220. Generally speaking, the more prevalent the TLS application 211, the higher the probability that the TLS application 211 is safe. The server name reputation may be determined by consulting a web reputation service, such as the TREND MICRO web reputation service, which maintains a listing of server names and uniform resource locators (URLs) and their reputations. The digital certificate may be evaluated for trustworthiness based on its authenticity, expiration, and reputation of the issuing authority.

The cloud security system 240 may evaluate (see arrow 503) the prevalence of TLS application 211, reputation of the server name, and the trustworthiness of the digital certificate to generate the reputation of the TLS application (see arrow 504). The cloud security system 240 may employ weighted feature comparisons, machine learning, or other suitable evaluation algorithms that take into account the prevalence of the TLS application 211, reputation of the server name, and the trustworthiness of the digital certificate to generate the reputation of the TLS application 211. The cloud security system 240 may be configured to provide the reputation of the TLS application 211, identified by the TLS fingerprint of the TLS application 211, to the network security device 230. The reputation of the TLS application 211 may indicate that the TLS application 211 is safe (good reputation) or malicious (bad reputation).

Figure 6:
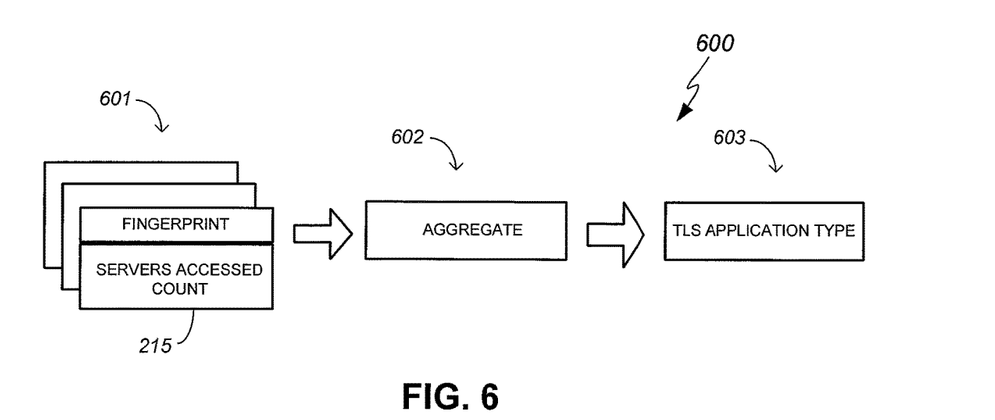
FIG. 6 is a flow diagram of a method of determining whether an application program is a browser or non-browser application in accordance with another embodiment of the present invention.

FIG. 6 is a flow diagram of a method 600 of determining whether a TLS application 211 is a browser or non-browser application in accordance with another embodiment of the present invention. The method 600 may be performed by the cloud security system 240 to determine whether a TLS application 211 is a browser or non-browser application.

In the example of FIG. 6, the cloud security system 240 receives a plurality of TLS metadata 215 from a plurality of agents 210 and/or network security devices 230 over the Internet (see arrow 601). The plurality of TLS metadata 215 may be received from different enterprise computer networks 220. In the example of FIG. 6, a TLS metadata 215 further includes the number of different servers accessed by a TLS application 211 over a period of time, which is also referred to herein as a "server accessed count". An agent 210 or network security device 230 may include the server accessed count in the TLS metadata 215 that is forwarded to the cloud security system 240.

The method 600 differs from the method 400 of FIG. 4 in that the server accessed count in the method 600 is from different enterprise computer networks 220. This allows for a more accurate determination of whether a TLS application 211 is a browser or non-browser application. More particularly, the cloud security system 240 may aggregate the server accessed count of a TLS application 211 across different enterprise computer networks 220 to generate an aggregated server accessed count for the TLS application 211 (see arrow 602), which may be compared to a threshold as previously described with reference to the method 400 of FIG. 4. More particularly, when its aggregated server accessed count exceeds the count threshold, the TLS application 211 may be deemed to be a browser application. Otherwise, when its aggregated server access count does not exceed the count threshold, the TLS application 211 may be deemed to be a non-browser application. The cloud security system 240 may provide the type of the TLS application 211 (see arrow 603), i.e., whether the TLS application 211 is a browser or non-browser application, to the network security device 230.

Figure 7:
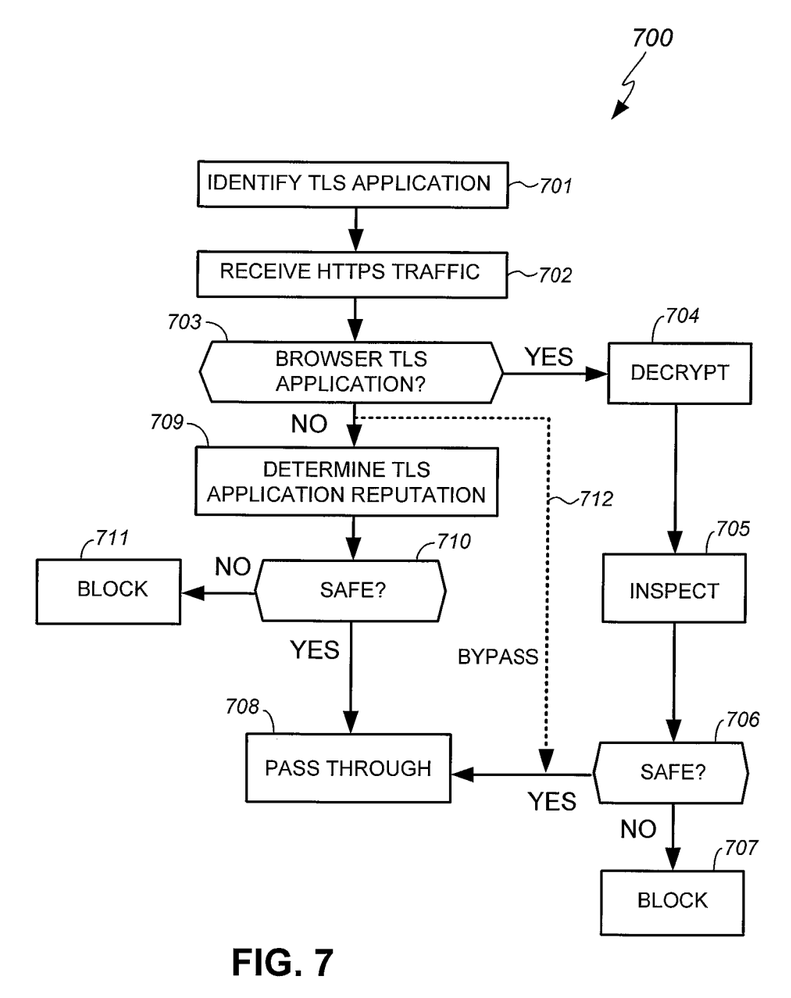
FIG. 7 is a flow diagram of a method of inspecting encrypted network traffic in accordance with an embodiment of the present invention.

FIG. 7 is a flow diagram of a method 700 of inspecting encrypted network traffic in accordance with an embodiment of the present invention. The method 700 may be performed by a network security device 230 to inspect encrypted network traffic in an enterprise computer network 220. The method 700 is explained using HTTPS traffic and the components shown in FIG. 2 for illustration purposes only. As can be appreciated, in light of the present disclosure, the method 700 may be applied on different encrypted network traffic and using other components.

In one embodiment, in each enterprise computer network 220, a network security device 230 receives all network traffic between client devices 250 of the enterprise computer network 220 and external server devices. This allows the network security device 230 to inspect, and block if needed, network traffic going into and out of the enterprise computer network 220. This further allows the network security device 230 to generate the TLS fingerprint of a TLS application. More particularly, the network security device 230 may receive the Client Hello message sent by a TLS application 211 to a server device 260, and generate the TLS fingerprint of the TLS application 211 from the cipher suite and TLS extensions indicated in the Client Hello message as previously described. The network security device 230 may also identify the selected cryptographic algorithm and other information for decrypting the subsequently encrypted network traffic.

In the example of FIG. 7, the network security device 230 identifies a TLS application 211 (step 701) by its TLS fingerprint. The network security device 230 receives encrypted network traffic in the form of HTTPS traffic (step 702) between the client device 250 and the server device 260. The network security device 230 may determine whether or not the TLS application 211 is a browser application (step 703). For example, the network security device 230 may consult the data store 231 for an entry for the TLS application 211 and an indicator of whether the TLS application 211 is a browser or non-browser application.

When the TLS application 211 is a browser application, the network security device 230 may decrypt the HTTPS traffic (step 703 to step 704) and inspect the decrypted network traffic (step 705) for conformance with the security policies of the enterprise computer network 220. The inspection may entail deep packet inspection of the packets and payloads of the network traffic, for example. The network security device 230 may employ any suitable packet inspection technique without detracting from the merits of the present invention. The network security device 230 may block the HTTPS traffic when the inspection indicates that the HTTPS traffic is not safe, such as when the HTTPS traffic is potentially malicious or in violation of a security policy (step 706 to step 707). Otherwise, when the inspection indicates that the HTTPS traffic is safe, the network security device 230 may allow the HTTPS traffic to pass through (step 706 to step 708) and be received by the client device 250.

When the TLS application 211 is not a browser application, the network security device 230 may determine the reputation of the TLS application (step 709 to step 710). For example, the network security device 230 may consult the data store 231 for an entry for the TLS application and a reputation of the TLS application. The network security device 230 may block the HTTPS traffic when the reputation of the TLS application indicates that the TLS application 211 is not safe (step 710 to step 711), such as when the TLS application 211 has a bad reputation. Otherwise, when the reputation of the TLS application 211 indicates that the TLS application 211 is safe, i.e., has a good reputation, the network security device 230 may allow the HTTPS traffic to pass through (step 710 to step 708) and be received by the client device 250.

In one embodiment, the network security device 230 may include a bypass mode of operation wherein inspection of encrypted network traffic is bypassed based on whether the TLS application 211 is a browser or a non-browser application. In the bypass mode of operation, the network security device 230 inspects the HTTPS traffic when the TLS application 211 is a browser application (as in step 703 to step 704), but does not perform inspection of the HTTPS traffic when the TLS application 211 is a non-browser application (as in step 703 to step 708, through path 712). More particularly, in the bypass mode of operation, when the network security device 230 identifies the TLS application 211 as a non-browser application, the network security device 230 simply allows the HTTPS traffic to pass through without inspection. This way, the network security device 230 does not necessarily require a bypass list that is manually maintained by the network administrator.

Methods and systems for inspecting encrypted network traffic have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
monitoring encrypted network traffic between a server device and a client device on a computer network, the client device running an application program that is in communication with a server program on the server device;
determining whether the application program is a browser application or a non-browser application;
when the application program is determined to be the non-browser application, determining a reputation of the application program; and
blocking the encrypted network traffic when the application program is the non-browser application and has a bad reputation,
wherein determining whether the application program is the browser application or the non-browser application comprises:
counting a number of different servers accessed by the application program within a period of time to generate a server accessed count;
deeming the application program to be the browser application when the server accessed count exceeds a count threshold; and
deeming the application program to be the non-browser application when the server accessed count does not exceed the count threshold.

2. The method of claim 1, further comprising, when the application program is determined to be the browser application:
decrypting the encrypted network traffic to generate a decrypted network traffic;
inspecting the decrypted network traffic; and
blocking the encrypted network traffic when the inspection indicates that the decrypted network traffic violates a security policy of the computer network that includes the client device.

3. The method of claim 1, further comprising:
generating a fingerprint for identifying the application program, the fingerprint being generated from data of a handshake message sent by the application program to the server device.

4. The method of claim 3, wherein the data of the handshake message comprises a listing of cryptographic algorithms supported by the application program.

5. The method of claim 3, further comprising:
generating metadata comprising the fingerprint, a server name of the server device, and a digital certificate of the server device; and
providing the metadata to a cloud security system.

6. The method of claim 5, further comprising:
generating, by the cloud security system, the reputation of the application program from the metadata.

7. The method of claim 1, wherein the encrypted network traffic is a Hypertext Transfer Protocol Secure (HTTPS) traffic.

8. A system for inspecting encrypted network traffic, the system comprising:
a plurality of client devices;
a cloud security system that is configured to receive from the plurality of client devices metadata of a plurality of application programs and to generate reputations of the plurality of application programs from corresponding metadata; and
a network security device that is configured to receive encrypted network traffic between a server device and a client device of the plurality of client devices, to identify an application program of the plurality of application programs running on the client device, to determine whether the application program is a browser application or a non-browser application, to determine a reputation of the application program in response to determining that the application program is the non-browser application, and to block the encrypted network traffic when the application program is the non-browser application and has a bad reputation,
wherein the network security device is configured to count a number of different servers accessed by the application program within a period of time to generate a server accessed count, to deem the application program to be the browser application when the server accessed count exceeds a count threshold, and to deem the application program to be the non-browser application when the server accessed count does not exceed the count threshold.

9. The system of claim 8, wherein the network security device is configured to decrypt the encrypted network traffic to generate a decrypted network traffic and to inspect the decrypted network traffic when the application program is determined to be the browser application.

10. The system of claim 8, wherein the network security device is configured to identify the application program from data of a client handshake message transmitted by the client device to the server device.

11. The system of claim 10, wherein the data of the client handshake message includes a list of cryptographic algorithms supported by the application program, and the network security device is configured to identify the application program by generating a fingerprint that is based on the list of cryptographic algorithms.

12. The system of claim 8, wherein a first client device of the plurality of client devices is configured to identify a list of cryptographic algorithms supported by a first application program running on the first client device from a client handshake message sent by the first application program to a first server device, to identify a server name of the first server device from the client handshake message, to extract a digital certificate of the first server device from a server handshake message sent by the first server device to the first application program, and to send a first metadata to the cloud security system,
wherein the first metadata comprises a fingerprint of the first application program, the server name of the first server device, and the digital certificate of the first server device.

13. The system of claim 12, wherein the cloud security system is configured to generate a reputation of the first application program based on a reputation of the server name of the first server device and a trustworthiness of the digital certificate of the first server device.

14. The system of claim 8, wherein the encrypted network traffic is a Hypertext Transfer Protocol Secure (HTTPS) traffic.

15. The system of claim 8, wherein the plurality of client devices are in different enterprise computer networks.

16. A computer-implemented method comprising:

receiving encrypted network traffic between a server device and a client device that is running an application program;

determining whether the application program is a browser application or a non-browser application;

when the application program is determined to be the browser application, decrypting the encrypted network traffic to generate a decrypted network traffic and inspecting the decrypted network traffic;

allowing the encrypted network traffic to pass through in response to determining that the application program is the non-browser application; and blocking the network traffic in response to determining that the application program is the browser application and the inspection indicates that the application program is not safe, wherein determining whether the application program is the browser application or the non-browser application comprises:

counting a number of different servers accessed by the application program;

deeming the application program as the browser application when the number of different servers accessed by the application program exceeds a count threshold; and deeming the application program to be the non-browser application when the number of different servers accessed by the application program does not exceed the count threshold.

17. The computer-implemented method of claim 16, further comprising, in another mode of operation, instead of allowing the encrypted network traffic to pass through in response to determining that the application program is the non-browser application:

determining a reputation of the application program in response to determining that the application program is the non-browser application; and blocking the encrypted network traffic in response to determining that the application program has a bad reputation.

18. The computer-implemented method of claim 16, further comprising:

generating a fingerprint of the application program;

identifying a server name of the server device;

extracting a digital certificate of the server device;

generating metadata comprising the fingerprint of the application program, the server name of the server device, and the digital certificate of the server device; and generating a reputation of the application program from the metadata.

\* \* \* \* \*